Patented Sept. 21, 1943

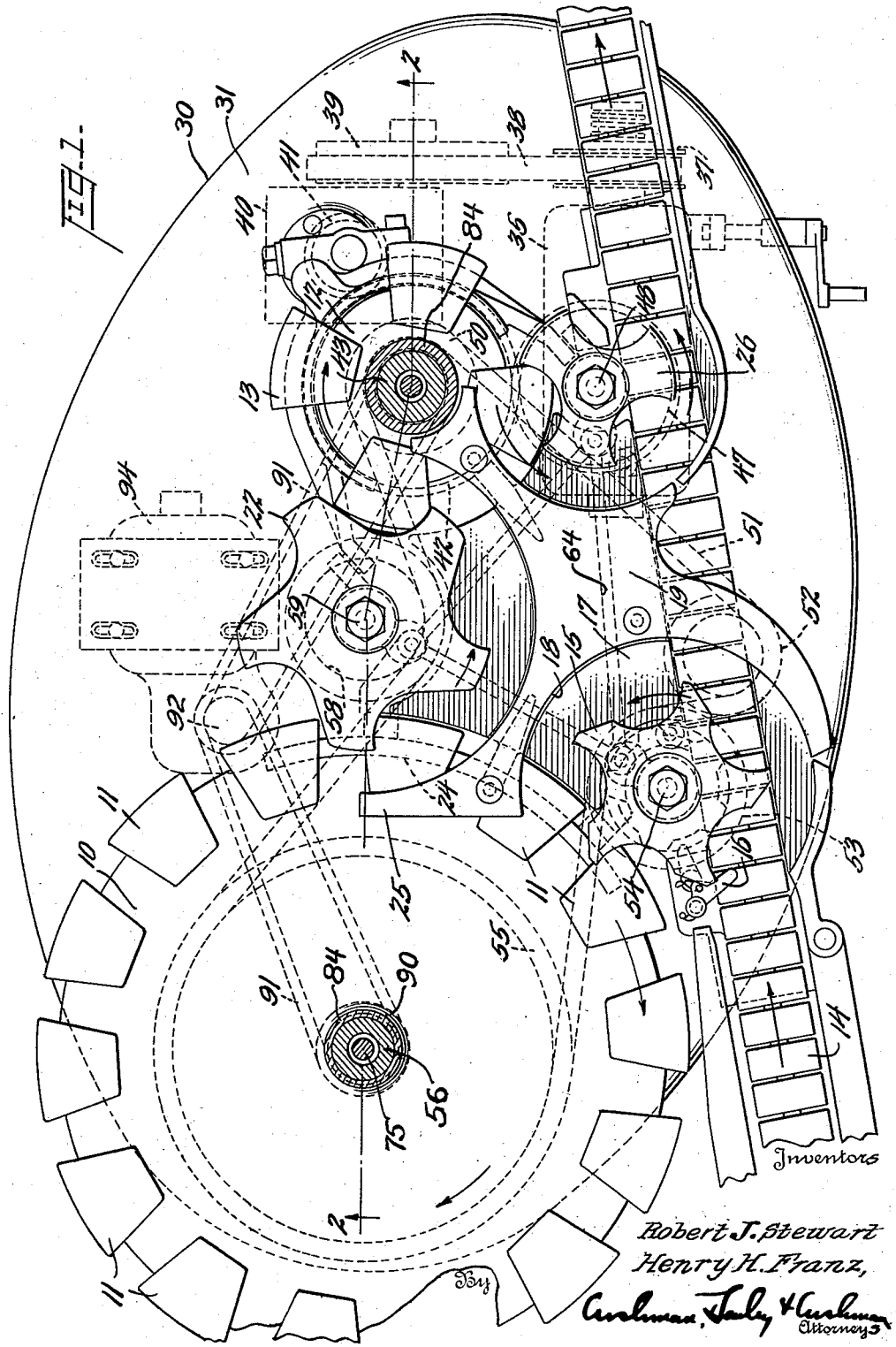

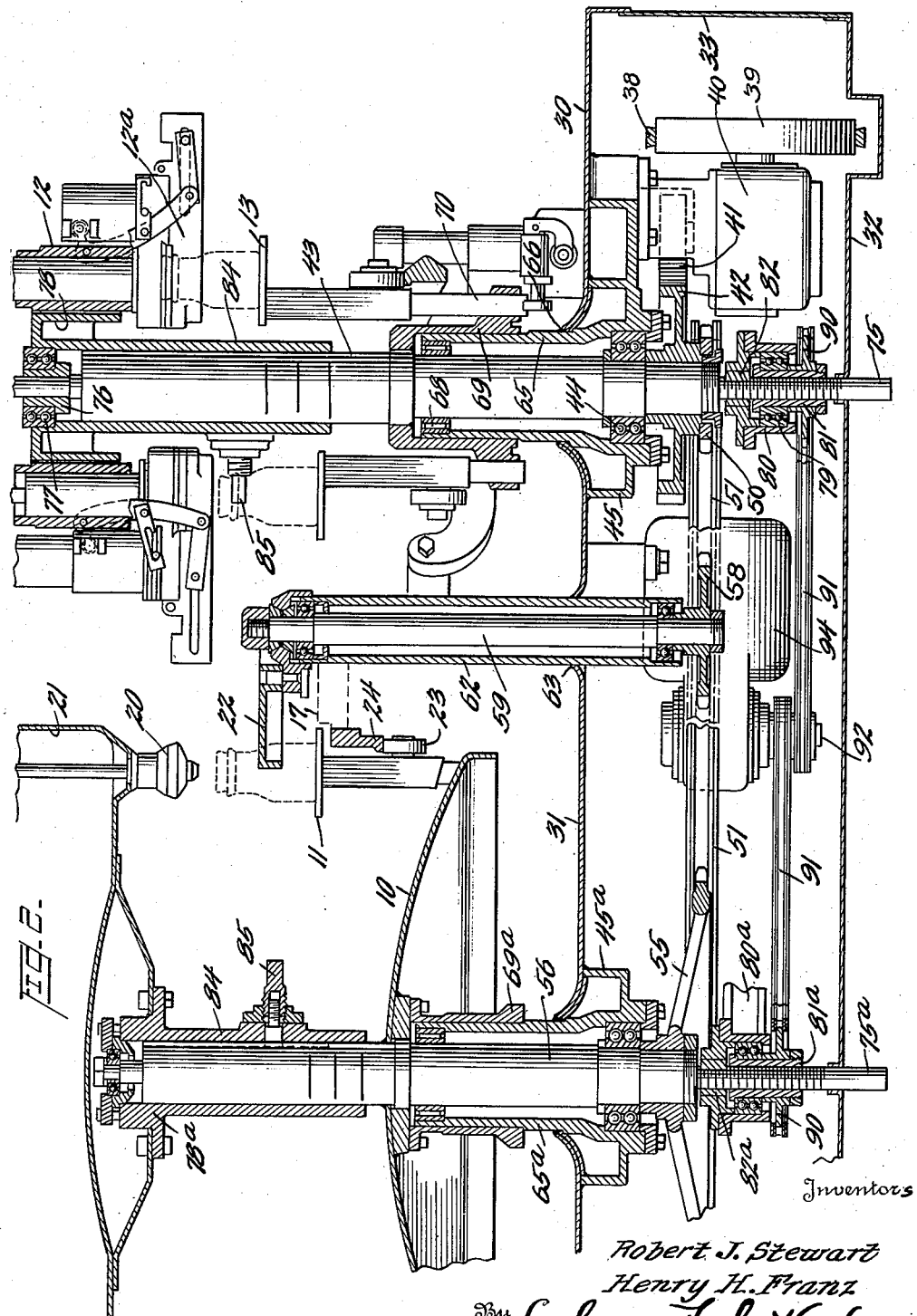

2,329,954

UNITED STATES PATENT OFFICE 2,329,954

FILLING MACHINE

Robert J. Stewart and Henry H. Franz, Baltimore, Md., assignors to Crown Cork & Seal Company, Inc., Baltimore, Md., a corporation of New York Application April 26, 1939, Serial No. 270,234

1 Claim. (Cl. 226—75)

The present invention relates to a filling machine.

The invention as herein disclosed is embodied in a milk filling apparatus. However, it will be understood that it may be incorporated in machines for filling other substances.

A principal object of the invention is to provide a machine capable of handling containers at high speeds, but which is also of such design that it may be readily cleaned.

It is particularly important that filling machines used in handling milk be of such construction that they can be readily cleaned. In dairy plants it is required that all machinery be thoroughly washed at least once a day, the washing being accomplished by the use of water and steam. For that reason, all of the elements of a milk filling machine which come in contact with the milk must be readily removable, and it is also desirable that the elements of the machine which contact with the milk containers be either readily removable or readily accessible for washing.

By the construction of the machine of this invention, all of the above requirements are complied with, and, in addition, the remainder of the machine can be thoroughly washed, but without any possibility of water or steam coming in contact with the driving mechanism of the apparatus. This latter feature is a particular advance over prior machines and is accomplished by enclosing the lower portion of the machine with a smooth surfaced casing including a depending skirt and by having the lower portions of all container handling elements of the machine enclosed in tubes extending up from and sealed with respect to the casing. By this construction, water or steam may be directed against the machine from any normal angle, but without danger of the washing fluid coming into contact with the driving mechanism. Conversely, it will be impossible for any grease or dirt to spread from the driving mechanism to the milk or container handling elements.

Another object of the invention is to provide a mechanism whereby the filling heads or capping heads of a filling machine may be readily vertically adjusted to handle containers of various heights.

Vertical adjustment of the filling heads and capping heads and their respective supports is usually accomplished by having the filling heads and the capping heads separately adjustable. The difficulty with this previous arrangement has been that even though indicia may be placed upon the machine to indicate the height at which the two sets of heads should be positioned to handle bottles of different sizes, nevertheless, if the two mechanisms are separately adjustable, they cannot be quickly positioned at the proper height by an operator, and unless extreme care is exercised, the mechanisms will not be at the proper height.

By the mechanism of the present invention, the filling and capping heads are simultaneously vertically adjustable from one point or source of power and the drive for the vertical movement is readily capable of being discontinued when the mechanisms are at the desired height. This arrangement has a further advantage in that when the machine is originally constructed, the two mechanisms can be accurately indexed and since no subsequent operator can change their position with respect to each other, they will both always be in proper relative position.

Another object of the invention is to provide a filling machine of such construction that its driving mechanism will be of minimum weight.

The above object is attained by the elimination of heavy pinions ordinarily used in the driving mechanisms of filling machines, and the substitution therefor of a single endless chain driven from the capping mechanism which drives all of the mechanisms except the outfeed dial. This construction eliminates much of the weight, but with no decrease in the operating efficiency or strength of the driving elements.

Other objects and advantages of the invention will be apparent from the following drawings wherein:

Figure 1 is a plan view of the table portion of a filling machine, the superstructure being omitted, and Figure 2 is a vertical sectional view on the line 2—2 of Figure 1 and showing the superstructure in vertical section.

The present machine includes a filling table 10 having bottle supporting platforms 11 vertically reciprocable above the same, and a capping mechanism 12 including vertically reciprocable bottle platforms 13. Bottles to be filled move into the machine upon a straight line endless conveyor 14 to an infeed dial or spider 15, movement of the bottles into the pockets of the infeed dial preferably being controlled by an article timing device 16 described in our application for Article timing device, Serial No. 259,896, filed March 4, 1939.

While moving with the infeed dial 15, the bottles are supported upon a stationary work table 17 and are held in the pockets of the dial by the adjacent arcuate edge 18 of a guide plate 19 positioned above the work table 17.

Infeed dial 15 moves the bottles from the work table 17 to the bottle supporting platforms 11 of the filling mechanism, which mechanism is shown rotating in a clockwise direction. During its movement upon the filling mechanism, a bottle is filled by means of the filling valves 20 carried in the reservoir 21. The filling valves 20 illustrated in Figure 2 are of the type disclosed in our application for Filling structure, Serial No. 215,680, filed June 24, 1938, and are operated to open or flowing position by contact of the mouth of a bottle therewith. The bottle platforms are raised to bring the bottles into contact with the filling heads 20 by action of a spring, not shown, within each supporting platform 11.

Rotation of the filling table 10 causes the filled bottles to be brought adjacent a continuously rotating transfer dial 22. As a bottle platform 11 approaches the dial 22, the platform will be lowered due to engagement of a roller 23 on the platform with a cam track 24 supported along the adjacent lower edge of the work table 17 as shown in Figure 2 so that the upper surface of the platform will be flush with the surface of the work table 17. The bottle will be simultaneously guided from the platform 11 by a projecting portion 25 of the guide plate 19.

Rotation of the transfer dial 22 will move the bottle across the surface of the work table 17 and position it upon a bottle supporting platform 13 of the capping mechanism 12. Each bottle supporting platform 13 of the capping mechanism will be lowered to a position flush with the work table 17 at the time that a bottle is placed thereon. Subsequently, as described in our application for Closure applying mechanism, Serial No. 259,898, filed March 4, 1939, the bottle platform will be raised to present the bottle to the aligned capping element 12a of the capping mechanism. When capping is completed, and due to rotation of the capping mechanism, the platform 13 will again be lowered to be flush with the work table 17 at the moment that the platform approaches an outfeed dial 26. Dial 26 will move the bottle along the adjacent arcuate edge of the guide plate 19 and upon the surface of the work table 17 to position it upon the outlet end of the straight line conveyor 14 for removal from the machine.

Referring more particularly to the structure of the apparatus, the reference numeral 30 designates the lower and casing portion of the machine which is of generally elliptical shape in plan view. Casing 30 includes a top wall 31 and a bottom wall 32, these two walls being joined by a side wall 33 which cooperates with the top and bottom walls to entirely encase the driving mechanism of the machine.

The casing 30 is supported upon short standards, not shown, so that it will be spaced above the floor. A motor 35 is suitably supported from the upper wall 31 of the casing 30, the motor including a horizontal shaft provided with a change speed pulley 37 to drive an endless belt 38. The belt 38 moves about a pulley 39 fixed to the driven shaft of a speed reduction unit 40.

The speed reduction unit 40 includes a vertical shaft provided with a pinion 41 which engages a larger pinion 42 fixed to a hollow shaft 43 which supports and rotates the capping mechanism 12. The hollow shaft 43 is journalled as indicated at 44 in a casting 45 secured to the upper wall 31 of casing 30.

The pinion 42 on the hollow shaft 43 also meshes with a smaller pinion 47 fixed to the vertical shaft 48 of the outfeed dial 26 so that the latter is rotated directly from the capping mechanism shaft 43.

The hollow shaft 43 of the capping mechanism has a sprocket wheel 50 fixed to the lower end thereof and the sprocket wheel drives an endless chain 51. The course of the endless chain 51 is best illustrated in Figure 1, from which it will be noted that in a clockwise direction from the hollow shaft 43 it first passes about a sprocket 52 indicated in dotted lines in Figure 1, thence about a sprocket 53 also shown in dotted lines and fixed to the vertical shaft 54 which carries the infeed transfer dial 15 so as to rotate this dial in a counterclockwise direction. From the sprocket 53, the sprocket chain 51 moves about a large sprocket 55 fixed to the hollow driving shaft 56 which supports and rotates the filling table 10 and the reservoir 21. Sprocket chain 51 then moves about a sprocket 58 fixed to the vertical shaft 59 which carries the transfer dial 22 so that the latter will be rotated in a counterclockwise direction.

By the above arrangement, all of the mechanisms of the machine with the exception of the outfeed dial 26 are driven from the capping mechanism by a single chain, resulting in a considerable reduction of the total weight of the machine.

The shaft of the idler sprocket 52 is suitably journalled in a bracket, not shown, supported from the upper wall 31 of the casing 30. Referring to Figure 2, it will be noted that the vertical shaft 59 of transfer dial 22 is journalled at the upper and lower ends of a stationary tube 62, which extends up through and is supported in an aperture 63 in the upper wall 31 of casing 30, the casing wall preferably being joined to the tube by welding or in similar manner to provide a water-tight seal between these two elements. The shafts 54 and 48, respectively, of the infeed and outfeed dials 15 and 26 are also journalled and supported in the manner just described.

The tube 62 which encloses transfer dial shaft 59 and the similar tubes which enclose the infeed and outfeed dial shafts 54 and 48 are joined by webs 64, shown in dotted lines in Figure 1 and extending beneath the stationary table 17 to also brace the latter.

The casting 45 shown in Figure 2 for supporting and journaling the hollow vertical shaft 43 of the capping mechanism 12 includes an upwardly projecting tubular portion 65 which extends through an aperture 66 in the upper wall 31 of casing 30, a weld preferably being provided at this joint. The upper end of the tubular portion 65 carries additional bearings 68 for the hollow shaft 43 and its exterior wall serves as a bearing or journal for a sleeve-like casting 69 in which are fixed vertical posts 70 upon which the bottle supporting platforms 13 of the capping mechanism are vertically slidable as described in our above-mentioned application for closure applying mechanism. The sleeve-like casting 69 is secured to the hollow shaft 43 by a weld, and it will be noted that since this casting extends downwardly along the tubular portion 65 of casting 45, it will prevent any water from moving downwardly into the casing 30 along the vertical shaft 43.

The hollow vertical shaft 56 which carries the filling table 10 and the filling reservoir 21 has its lower portion journaled in a casting 45a, including an upwardly projecting tubular portion 65a welded to the upper wall 31 of casing 30. Also, a sleeve 69a is fixed to the underside of the filling table 10 to project downwardly along and rotate upon the fixed tubular portion 65a, thereby preventing water from moving into the casing 30 along the hollow shaft which supports the filling mechanism.

By the manner of enclosing the various driving shafts of the machine which has been described above, all of the driving elements, such as the motor and various gears, are entirely isolated against contact with any water which might be directed upon the machine for washing purposes. This construction is extremely important in a milk filling machine, since sanitary requirements necessitate that all parts of these machines which may possibly come into contact with milk or milk containers be washed with strong streams of water and steam at least once a day. It will be noted that while all of the parts of the present machine which necessitate washing are readily accessible to cleaning elements used by an attendant, it will not be possible for any liquid to reach the driving elements. Furthermore, the fact that the casing 30 is supported upon standards, not shown, so that its lower wall will be a substantial distance above the floor, will enable the space below the machine to be kept thoroughly clean.

The guide plate 19 is removable with respect to the stationary table 17, and the dials 16, 22 and 26 are also removable from their respective shafts, all in the usual manner and in order that guide plates and dials of proper conformation may be positioned upon the machine for use with bottles of other sizes.

It is desirable to form all of the exposed metal parts of the machine of a non-rusting metal, so that the machine can be frequently washed without danger of corrosion.

The following structure is provided in order to enable the capping heads 12a of the capping mechanism and also the filling heads 20 to be vertically adjusted to permit the machine to operate upon the bottles of different sizes. A post 75 extending upwardly through the hollow drive shaft 43 of the capping mechanism is shouldered at its upper end to support a collar 76. The collar 76 carries the inner element of a roller bearing 77, the outer element of the bearing being secured to a casting 78 in which the capping heads 12a are supported. At its lower end, shaft 75 is journaled at 79 in a beam 80 extending across the interior of the casing 30. The inner element of journal 79 includes a sleeve 81 having a threaded bore through which the lower and threaded portion of shaft 75 extends. A collar 82 is fixed to the beam 80 above the threaded sleeve 81, collar 82 being keyed to shaft 75 to prevent the latter from rotating.

As shown at the left hand portion of Figure 2, a post 75a supports the filling reservoir 21 in a manner generally similar to that described for supporting the casting 78 of the capping mechanism, the upper end of shaft 75a being rotatably connected to a casting 78a depending from the reservoir. The lower end of shaft 75a is journaled in a cross beam 80a and is threaded to be engaged by a threaded sleeve 81a, but is held against rotation by a keyed collar 82a.

The castings 78 and 78a of the capping mechanism and filling mechanism, respectively, include tubular portions 84 which extend down along the hollow driving shafts of these two mechanisms. A locking device 85 is provided on each of the sleeves 84 to enable them to be locked upon the hollow shafts to insure that they will rotate with the shafts.

The sleeves 81 and 81a at the lower end of the normally stationary shafts 75 and 75a, respectively, have sprocket wheels 90 secured thereto and a sprocket chain 91 extends from each of these sprockets to a corresponding sprocket wheel upon a vertical worm shaft 92 driven from a motor 94 supported from the upper wall 31 of casing 30.

When it is desired to raise or lower the capping heads 12a and the filling reservoir 21, it is only necessary to release the locking devices 85 and then energize the motor 94. When this is done, the sprocket wheels 90 will simultaneously be rotated, causing the threaded sleevs 81 and 81a to rotate, moving the shafts 75 and 75a either upwardly or downwardly, according to the direction in which the motor 94 is driven. Rotation of the shafts 75 and 75a will, of course, be prevented by the keyed sleeves 82 and 82a fixed to the beams 80 and 80a. The outer surfaces of the hollow shafts 43 and 56 may be marked or indexed as shown to indicate the points at which the lower edges of the sleeves 84 should be positioned with respect to the hollow shafts to enable the capping mechanism and filling mechanism to operate upon various sizes of bottles. When the mechanisms have been positioned at the desired height, the locking devices 85 may be tightened to secure the reservoir 21 and capping mechanism 12 to their respective hollow drive shafts. Obviously, when the machine is driven from the main driving motor 35, the capping mechanism 12 will rotate with the hollow shaft 43, the casting 78 turning with respect to non-rotatable shaft 75, and the same will be true of the corresponding elements of the filling mechanism.

It is desirable to have the locking devices 85 engage vertical key-ways in the hollow drive shafts 43 and 56 in order that the position of the capping heads and the filling heads circumferentially with respect to the aligned bottle supporting platforms cannot be varied.

Due to the low speed of rotation which will be imparted to the threaded sleeves 81 and 81a by the motor 94 acting through the worm shaft 93 and the worm-type drive between the sleeves 81 and 81a and shafts 75 and 75a, the speed of raising or lowering the filling and capping mechanisms will be sufficiently slow that even an unskilled bottling plant employee can readily stop the vertical movement of these mechanisms at the desired vertical point upon the hollow shafts 43 and 56. The direction of movement of the shafts 75 and 75a will of course be controlled by the reversability of the motor 94.

The shape of the casing 30 in plan is found desirable in that the projecting corners which would be present in a rectangular structure are eliminated and all of the elements of the machine can readily be reached by an operator standing alongside the machine. The fact that the top wall of the casing 30 is also relatively low also enables an attendant to readily reach all portions of the machine. The low elevation of the casing 30 will be apparent from the drawings when it is borne in mind that the stationary table 17 is approximately waist-high.

It will be clear from the above that the construction of the present machine is such that it can readily be cleaned and serviced and that it otherwise fulfills the various objects of our invention.

The terminology used in the specification is for purposes of description, the scope of the invention being indicated in the following claim.

We claim:

In a filling machine, a rotatable filling mechanism including a reservoir having filling heads associated therewith, a rotatable capping mechanism, normally stationary posts to support said mechanisms for rotation, said posts being threaded at their lower ends, means to hold said posts against rotation, gear wheels threaded to said posts, means to support said gear wheels and hold the same against vertical movement, and a reversible electric motor to rotate said gear wheels.

ROBERT J. STEWART.
HENRY H. FRANZ.